Oct. 4, 1966  J. LOUDON ET AL  3,276,800
BEAM CLIP
Filed May 7, 1963
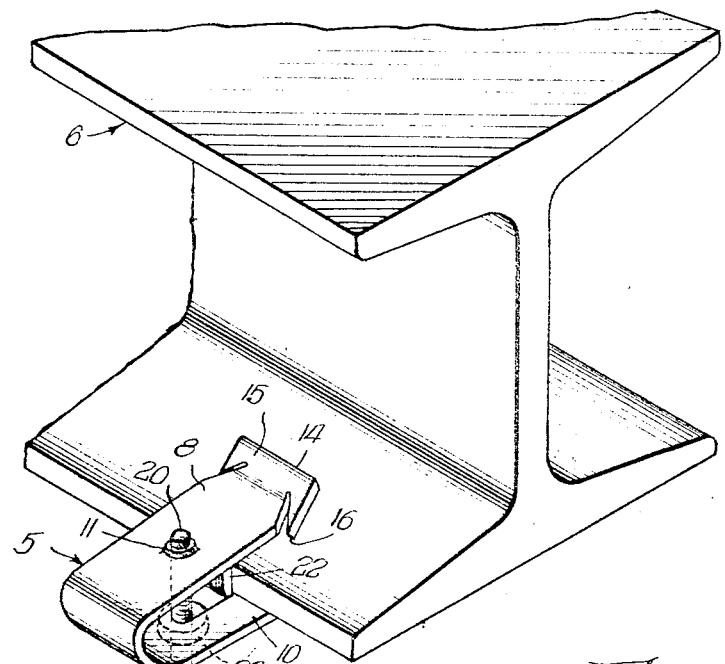
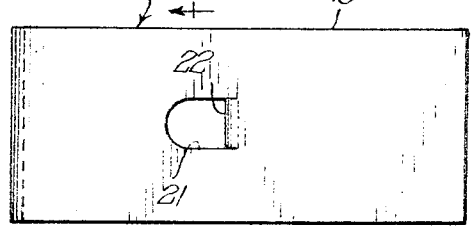
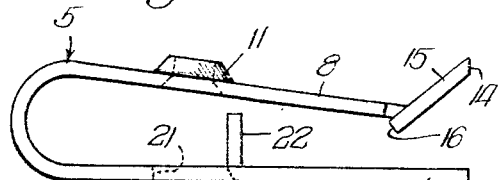
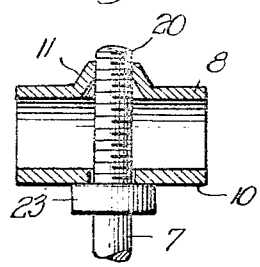
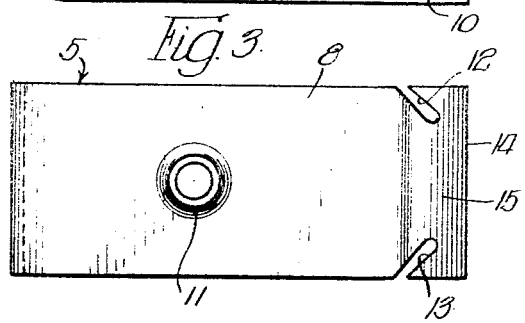
INVENTORS.
James Loudon,
BY William R. Brown,

United States Patent Office 3,276,800
Patented Oct. 4, 1966

3,276,800
BEAM CLIP
James Loudon, Arlington Heights, and William R. Brown, Wheaton, Ill., assignors to Minerallac Electric Company, Chicago, Ill., a corporation of Illinois
Filed May 7, 1963, Ser. No. 278,650
4 Claims. (Cl. 287—189.35)

This invention relates to improvements and innovations in beam clips or spring clips of the type used for rapid, economical installation of bridle rings and the like on the flanges of structural beams or other structural members with free edges.

Heretofore, various types of clips have been proposed and used for supporting so-called bridle rings and the like on beam flanges. Such bridle rings may then be used for supporting or stringing telephone wires or the like.

The object of the present invention, generally stated, is the provision of improved beam or spring clips, and spring clip-bridle ring combinations, characterized by: A clip member which is very economical to produce both with respect to the cost of the material and cost of manufacturing; the ease with which the clip member may be applied to a beam flange or other free edge; the positiveness with which the clip member becomes locked in place so as to prevent accidental removal or displacement; and the clamping action which is obtained by virtue of a collar on the threaded shank of a bridle ring, screw eye or hook member engaging the outer side of one leg of the clip member so as to draw this leg inwardly toward an opposed leg having a threaded aperture in which the threaded shank is engaged.

Certain other objects of the invention will, in part, be obvious and will in part appear hereinafter. For a more complete understanding of the nature and scope of the invention reference may now be had to the following detailed description thereof taken in connection with the accompanying drawings wherein:

FIG. 1 is a perspective view showing a beam clip-bridle ring device foming one embodiment of the invention in place in a typical and normal position on one flange of an I-beam;

FIG. 2 is a side elevational view of the beam clip shown in FIG. 1 and drawn to a scale approximately twice one size of clip;

FIG. 3 is a top plan view of the device as shown in FIG. 2;

FIG. 4 is a bottom plan view of the device as shown in FIG. 2; and

FIG. 5 is a sectional view taken on line 5—5 of FIG. 4.

In FIG. 1 a beam clip or spring clip is indicated generally at 5 made in accordance with the present invention so as to constitute one illustrative embodiment thereof and shown in place on one free edge or flange of an I-beam 6. It will be understood that the I-beam 6 is merely illustrative of any suitable structural member having a free edge onto which the beam clip or spring clip may be clamped. For example, the spring clip 5 could be also placed on one of the flanges of a simple angle member, a channel member, a T-member, etc.

The beam clip or spring clip 5 as shown in FIG. 1 comprises only two parts—the clip member 5 itself and a so-called bridle ring 7 which could also be a hook, screw eye, or the like. The spring clip 5 is generally U-shaped and formed of flat spring stock, such as spring steel. In the unstressed condition it can have the shape shown in FIG. 2.

As shown in the drawings the so-called upper leg of the U-shaped member is indicated at 8 while the so-called lower leg is indicated at 10. An aperture is punched into the upper leg 8 in an intermediate location in such manner as to raise some of the material and form a short sleeve section 11 which is of such depth as to carry several threads on the interior.

A further operation is performed on the upper leg 8. Adjacent its free end two notches, cuts or incisions are formed inwardly from the side edges as indicated at 12 and 13 in FIG. 3. It will be seen that these cuts are directed inwardly toward the center line of the leg 8 as well as in the direction of its outer free edge 14. After the cuts or notches 12 and 13 are formed, the free end is bent outwardly as shown in FIG. 2 so as to form the outwardly turned lip 15. The purpose of this lip 15 is to facilitate the ease with which the spring clip 5 may be pressed and installed over the free edge of a flange or like member.

When the lip 15 is turned out it will be seen that it bends along a line which extends between the innermost ends of the cuts or notches 12 and 13. As a result the little triangular portions formed by these cuts 12 and 13, project both outwardly from the center line of the leg 8 as well as rearwardly from the free edge 14. These small triangular projections constitute prongs which readily slide over a free edge in one direction but which tend to bite or dig into the material when pulled in the opposite direction so as to prevent accidental withdrawal of the clip member from an edge. The point of one of the prongs is indicated at 16 in FIG. 2.

In order to accommodate the threaded shank portion 20 of the bridle ring 7 and allow it to freely enter the threaded collar 11, a non-threaded opening 21 is formed in the lower leg 10 by striking up from the strip material at inner tongue 22. The tongue is sufficiently wide so that the opening which is left will accommodate the shank 20 of the bridle ring 7 without binding and as a matter of fact the opening should be somewhat elongated in a front to rear direction so that there is no binding of the shank or stem 20 against the side of this opening 21 regardless of the degree to which the legs 8 and 10 may be spread apart in normal usage of the beam clip 5. The tongue 22 is struck up on the side of the opening 21 toward the open ends of the clip member 5 (i.e. away from the bite portion of the clip member). By being raised in this position the tongue 22 limits the distance to which the clip member 5 may be pushed over the free edge of a flange or like projection. Accordingly, the tongue 22 acts to prevent the opening 21 from being obstructed. Of course a tongue could be struck up at right angles to the plane of tongue 22 provided one side edge would serve to arrest inner positioning of the clip member 5.

The bridle ring 7 is provided with an integrally formed collar portion 23 (FIG. 5) at the inner end of the threaded portion 20. These collars may be formed in automatic heading machines in known manner. The collar 23 fits against the outside of the lower leg member 10 at the margin of the opening 21. Hence, it will be seen that by tightening the bridle ring 7 a condition will be reached where the collar 23 engages the leg member 10 and further turning of the bridle ring will act to draw the legs 8 and 10 together inasmuch as the raised collar portion 11 on the leg 8 constitutes an integral nut member. Inasmuch as the legs 8 and 10 are held apart or separated at one end by the flange or other edge over which they are clipped, and by the bite portion at the other end, it will be seen that they can be sprung together to some degree.

The clip member 5 may be manufactured at low cost and in large volumes using well known and commercially available production equipment. The clip member is stamped out from flat stock and the various operations may be simultaneously performed thereon such as the forming of the raised collar portion 11, the striking up of the tongue 22, the cutting of the notches or incisions 12 and 13, and the bending of the lip 15. The raised collar 11 is tapped and then the clip member is folded or bent into the U-shape shown in FIG. 2. The collared bridle rings 7 may also be produced on high volume known equipment. Hence, the unit cost of a clip-bridle ring combination can be very low.

Obvioulsy certain minor changes may be made in the embodiment of the invention specifically shown and described. The internally threaded collar 11 could be punched inwardly instead of outwardly. A single incision 12 or 13 would suffice in certain instances. While spring steel is the preferred material, other metals or plastic could be used. In the event a bridle-ring 7 is lost or missing, a conductor could be passed through the bite portion of the clip 5. If the strip material is sufficiently thick it may not be necessary to have a raised collar portion 11 since a plain hole may be tapped. Other changes will occur to those skilled in the art.

What is claimed as new is:

1. A spring clip of the class described comprising a generally U-shaped member formed of flat spring material, the free end of at least one of the two leg members being cut both inwardly and toward said free end from at least one edge thereof and bent outwardly to provide both an out-turned lip and at least one inturned prong which projects both outwardly of the center line of the clip member and rearwardly from said free end, said lip facilitating placement of the open end of said clip over a free edge and said prong interfering with accidental removal of said clip, one of said legs intermediate its ends being provided with an internally threaded screw-receiving aperture, and the other leg being provided with a non-threaded opening in opposed registry with said threaded aperture, said non-threaded opening being formed by striking a tongue inwardly from said other leg so that at least a portion thereof serves as an obstruction to prevent said clip from being pushed in sufficiently far during placement to allow said non-threaded opening to be obstructed.

2. The spring clip of claim 1 wherein said screw-receiving aperture is in the form of an integral punched collar portion.

3. The spring clip of claim 1 wherein said tongue is in a plane generally perpendicular to the center line of said other leg.

4. A clip of the class described comprising in combination:

(a) a generally U-shaped member formed of flat spring material, the free end of at least one of the two leg members being cut both inwardly and toward said free end from at least one edge thereof and bent outwardly to provide both an outurned lip and at least one inturned prong which projects both outwardly of the center line of the clip member and rearwardly from said free end, said lip facilitating placement of the open end of said clip over a free edge, and said prong interfering with accidental removal of said clip, one of said legs intermediate its ends being provided with an internally threaded screw-receiving aperture, and the other leg being provided with a non-threaded opening in opposed registry with said threaded aperture, said non-threaded opening being formed by striking a tongue inwardly from said other leg so that at least a portion thereof serves as an obstruction to prevent said clip from being pushed in sufficiently far during placement to allow said non-threaded opening to be obstructed; and (b) a bridle ring having its threaded shank screwed into said threaded screw-receiving aperture from the inner side thereof and said shank having a collar which is adapted to engage said other leg at the outer margin of said non-threaded aperture.

References Cited by the Examiner
UNITED STATES PATENTS

| | | |
|---|---|---|
| 696,422 | 4/1902 | Duffy. |
| 2,921,766 | 1/1960 | Bauer _____ 189—35 X |

HARRISON R. MOSELEY, *Primary Examiner.*

A. I. BREIER, *Assistant Examiner.*